(12) United States Patent
Mitchell et al.

(10) Patent No.: US 8,456,740 B2
(45) Date of Patent: Jun. 4, 2013

(54) METHOD AND APPARATUS FOR PATHLENGTH ADJUSTMENT IN AN OPTICAL SYSTEM

(75) Inventors: Daniel B. Mitchell, Port McNicoll (CA); Douglas J. Brown, Midland (CA); Geoffrey G. Harris, Midland (CA)

(73) Assignee: Raytheon Company, Waltham, MA (US)

( * ) Notice: Subject to any disclaimer, the term of this patent is extended or adjusted under 35 U.S.C. 154(b) by 610 days.

(21) Appl. No.: 12/760,846

(22) Filed: Apr. 15, 2010

(65) Prior Publication Data
US 2011/0255187 A1    Oct. 20, 2011

(51) Int. Cl.
G02B 5/28 (2006.01)
G02B 27/14 (2006.01)

(52) U.S. Cl.
USPC ............... 359/589; 359/634

(58) Field of Classification Search
USPC ............... 359/589, 634
See application file for complete search history.

(56) References Cited

U.S. PATENT DOCUMENTS

2008/0239496 A1* 10/2008 Akiya .................... 359/588
2010/0259728 A1* 10/2010 Iyoda et al. .............. 353/31

* cited by examiner

Primary Examiner — William Choi
(74) Attorney, Agent, or Firm — Lando & Anastasi, LLP (57) ABSTRACT

A method and apparatus involve: routing first radiation and second radiation respectively having first and second wavelengths that are different along respective first and second optical paths; reflecting the first radiation with an optical component as the first radiation is traveling along the first optical path; and reflecting the second radiation with the optical component as the second radiation is traveling along the second optical path, the optical component causing a first optical path length traveled by the first radiation along the first optical path from arrival at to departure from the optical component to be shorter than a second optical path length traveled by the second radiation along the second optical path from arrival at to departure from the optical component.

20 Claims, 5 Drawing Sheets

METHOD AND APPARATUS FOR PATHLENGTH ADJUSTMENT IN AN OPTICAL SYSTEM

FIELD OF THE INVENTION

This invention relates in general to optical systems and, more particularly, to techniques that compensate for dispersion in optical systems.

BACKGROUND

In an optical system, a transmissive optical element such as a lens or window will often exhibit slightly different indexes of refraction to respective different wavelengths of radiation. This is commonly referred to as the dispersion characteristic of the component. When different wavelengths pass through the optical component, they can be displaced relative to each other. As a result, they will typically have different optical path lengths within the component, and will ultimately focus at different locations along an optical axis. If the different wavelengths pass through multiple optical components, the effects of different optical path lengths for respective wavelengths can be cumulative.

To design a viable optical system that functions at two or more wavelengths, it is generally necessary to minimize dispersive effects. However, minimizing dispersive effects adds a significant level of complexity to the design process, particularly as the system's range of operational wavelengths increases. Not only must suitable optical materials such as glasses be selected for the various optical components, but suitable shapes, a suitable order, and suitable positions must also be determined. The materials, shapes, order and positions of the optical components interact, and thus a designer usually must spend a great deal of time balancing all of these interacting factors in order to find an acceptable combination. Although pre-existing techniques of this general type have been generally adequate for their intended purposes, they have not been satisfactory in all respects.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
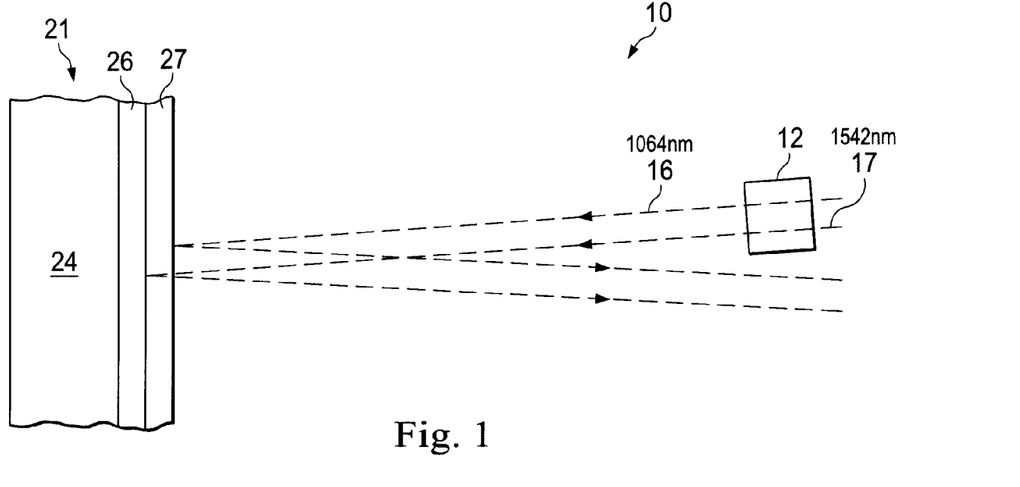
FIG. 1 is a diagrammatic view of an apparatus that is an optical system, and that includes an optical component.

FIG. 1 is a diagrammatic view of an apparatus that is an optical system 10. The following discussion of the optical system 10 mentions various thicknesses, and in this regard it is relevant to understand the difference between physical thickness and optical thickness. More specifically, optical thickness "t" is defined as refractive index "n" multiplied by the actual physical thickness "d", or in other words t=nd. Thus, if two different materials have identical physical thicknesses but different refractive indices, they will have different optical thicknesses. Conversely, if two materials have identical optical thicknesses and different refractive indices, they will have different physical thicknesses.

Focusing specifically now on the optical system 10, an element 12 that is a piece of fused silica has a physical thickness of 1 cm. Two beams 16 and 17 of laser light pass through the element 12, and have different wavelengths. In particular, the beam 16 has a wavelength of 1064 nm, and the beam 17 has a wavelength of 1542 nm. These two specific wavelengths are mentioned here only for the sake of example. The beams 16 and 17 could alternatively have other wavelengths, provided the wavelength of beam 16 is different from the wavelength of beam 17. The beams 16 and 17 would typically be coincident but, for purposes of clarity in explaining the optical system 10, they are depicted in FIG. 1 as being slightly spaced.

The element 12 of fused silica exhibits slightly different indexes of refraction with respect to the respective wavelengths of each of the beams 16 and 17. In particular, the element 12 exhibits a refractive index of 1.44963 with respect to the 1064 nm wavelength of beam 16, and exhibits a refractive index of 1.44412 with respect to the 1542 nm wavelength of beam 17. Due to this slight difference in refractive indexes, the beams 16 and 17 will be displaced with respect to each other as they travel through the element 12, thereby causing the optical path length traveled by the beam 16 within element 12 to be about 55.1 µm longer than the optical path length traveled by beam 17 within element 12. As a result, the beams 16 and 17 will ultimately focus at different points along an optical axis.

The fact that different wavelengths are influenced differently by the element 12 is commonly referred to as the dispersion characteristic of the element 12. For simplicity, FIG. 1 shows only a single element 12 with a dispersion characteristic that exerts a different influence on each of the beams 16 and 17. However, the element 12 is just one example of optics having a dispersion characteristic. In place of the element 12, some other optical component, or a combination of optical components, could produce dispersion.

The optical system 10 includes another optical component 21 that is provided specifically to counteract and thus compensate for the dispersive effect of the element 12. In more detail, and as noted above, the optical path length traveled by beam 16 within element 12 is about 55.1 µm longer than the optical path length traveled by beam 17 within element 12. The optical component 21 introduces an optical path length differential that is approximately equal and opposite to that introduced by the element 12. Thus, the optical path length traveled by beam 17 within optical component 21 is about 55.1 μm longer than the optical path length traveled by beam 16 within the optical component.

For clarity, the optical component 21 is not shown to scale in FIG. 1. The optical component 21 includes a substrate 24 that, in the disclosed embodiment, is made of an optical glass. More particularly, the substrate 24 in FIG. 1 is made from a material that is commonly known as BK7 glass, and that can be obtained commercially from a number of sources, one of which is Red Optronics of Mountain View, Calif. Alternatively, however, the substrate 24 could be made of any other suitable material.

The optical component 21 also includes a reflective section 26 that is provided on one side surface of the glass substrate 24, and a further reflective section 27 that is provided on a side of the reflective section 26 opposite from substrate 24. The reflective section 26 is reflective to the beam 17, or in other words is reflective to radiation within a range of wavelengths that includes the wavelength 1542 nm. The reflective section 27 passes the beam 17, and reflects the beam 16. In other words, the reflective section 27 is transmissive to radiation within a range of wavelengths that includes the wavelength 1542 nm, and is reflective to radiation within a different range of wavelengths that includes the wavelength 1064 nm. The reflective section 27 has an optical thickness of approximately 27.55 μm, or in other words half of 55.1 μm.

It will be noted from FIG. 1 that, although the beam 16 is reflected by the reflective section 27, the beam 17 passes through the reflective section 27, is reflected by the reflective section 26, and then passes back through the reflective section 27. Thus, due to the fact that the beam 17 passes through the reflective section 27 twice, the optical path length of the beam 17 within the optical component 21 is about 55.1 μm longer than that for the beam 16, thereby counteracting and compensating for the optical path length differential introduced by the element 12.

Figure 2:
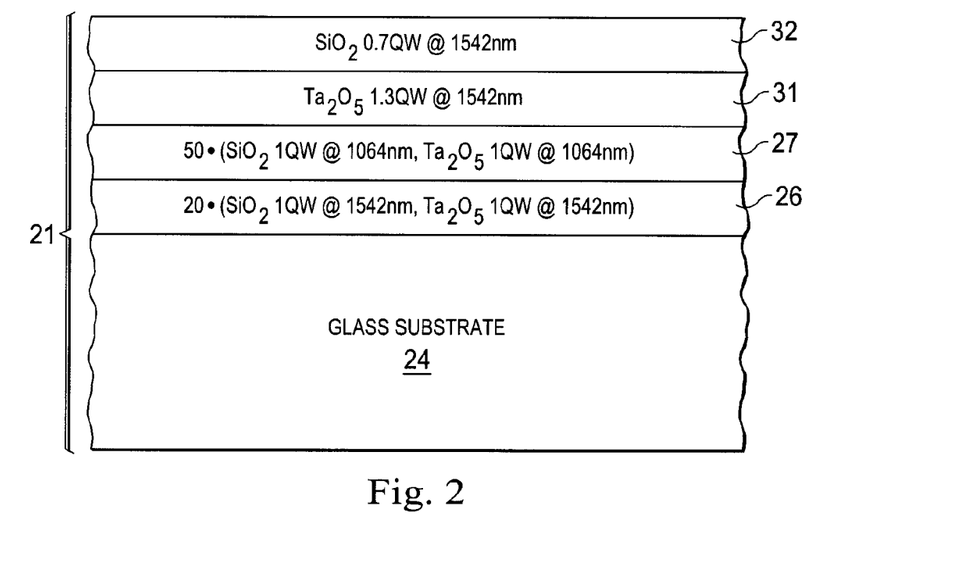
FIG. 2 is a diagrammatic fragmentary sectional side view showing the optical component of FIG. 1 in an enlarged scale, and providing additional detail regarding its structure.

FIG. 2 is a diagrammatic fragmentary sectional side view showing the optical component 21 of FIG. 1 in an enlarged scale, and providing additional detail about its structure. For clarity, the various portions of the optical component 21 are not shown to scale in FIG. 2. In FIG. 2, the reflective sections 26 and 27 are each implemented as a multi-layer thin-film optical filter. The reflective section 26 includes alternating layers of silicon dioxide ($SiO_2$) and tantalum oxide ($Ta_2O_5$) that each have an optical thickness of 1 quarter-wave (QW) of the wavelength 1542 nm, or in other words an optical thickness that is 25% of 1542 nm, and thus 385.5 nm. Reflective section 26 includes 20 of the $SiO_2$ layers, and 20 of the $Ta_2O_5$ layers. Similarly, the reflective section 27 includes alternating layers of $SiO_2$ and $Ta_2O_5$ that each have an optical thickness of 1 QW of the wavelength 1064 nm, or in other words an optical thickness that is 25% of 1064, and thus 266 nm. Reflective section 27 includes 50 of the $SiO_2$ layers, and 50 of the $Ta_2O_5$ layers.

The optical component 21 further includes two thin layers 31 and 32 that are provided on the outer side of the reflective section 27. Layers 31 and 32 are so thin that they are not shown separately in FIG. 1, but they are shown diagrammatically in FIG. 2. Layer 31 is a single layer of $Ta_2O_5$ having an optical thickness of 1.3 QW of the wavelength 1542 nm. Layer 32 is a single layer of $SiO_2$ having an optical thickness of 0.7 QW of the wavelength 1542 nm. Absent the layers 31 and 32, the reflective section 27 would reflect a small portion of the energy of the beam 17 having the wavelength of 1542 nm. The layers 31 and 32 serve to prevent any significant reflection of the radiation of beam 17, so that virtually all the radiation of beam 17 enters the optical component 21 and travels through the reflective section 27 to the reflective section 26.

The specific materials and layers shown in FIG. 2 represent only one possible configuration for the optical component 21. Other configurations of materials and/or other layers could alternatively be utilized. For example, if the beams 16 and 17 of FIG. 1 happened to have wavelengths different from the two exemplary wavelengths of 1064 nm and 1542 nm discussed above, the materials and/or structure of the optical component 21 would be adjusted so as to provide appropriate optical path-length compensation for the specific wavelengths involved.

The particular construction shown in FIG. 2 for the optical component 21 assumes that the beams 16 and 17 of FIG. 1 each impinge on the optical component 21 at an angle of approximately 10° with respect to a not-illustrated reference line extending perpendicular to the layers in the optical component 21. In some other application where radiation will impinge on the optical component 21 at a different angle, the combination of materials and/or layering can be adjusted to optimize performance for that angle.

Figure 3:
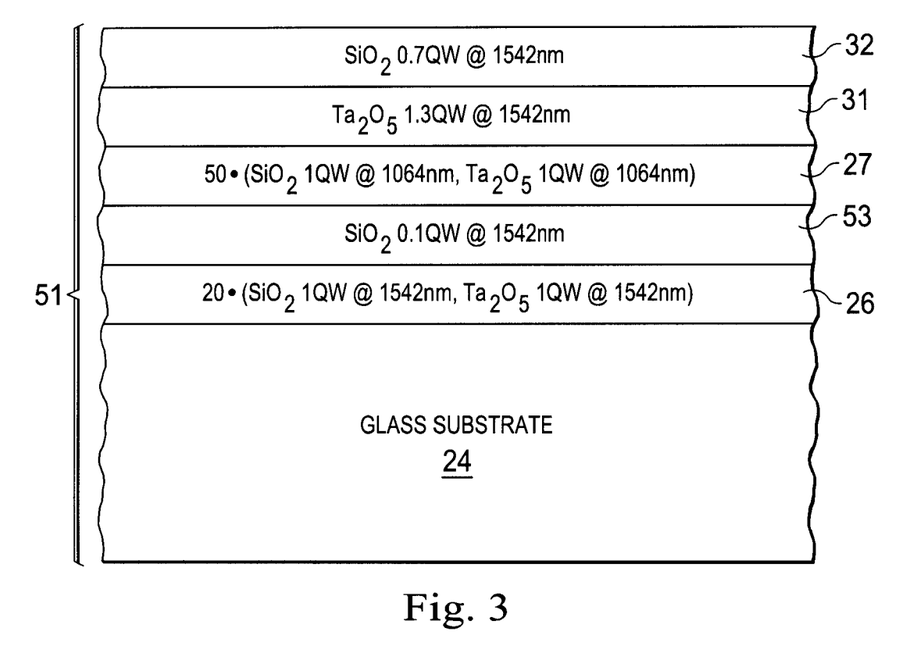
FIG. 3 is a diagrammatic fragmentary sectional side view of an optical component that is an alternative embodiment of the optical component of FIGS. 1 and 2.

The specific construction shown in FIG. 2 for the optical component 21 reduces the overall optical path length differential between beams 16 and 17 to about 0.3 μm. In order to reduce this differential to approximately zero, an additional layer can be added between the reflective sections 26 and 27, and can have an optical thickness of 0.15 μm (0.3 μm divided by 2). In this regard, FIG. 3 is a diagrammatic fragmentary sectional side view of an optical component 51 that is an alternative embodiment of the optical component 21 of FIGS. 1 and 2. Identical or equivalent portions are identified with the same reference numerals, and the following discussion will focus on the differences. For clarity, the optical component 51 is not shown to scale in FIG. 3.

The optical component 51 is effectively identical to the optical component 21, except that an additional layer 53 has been added between the reflective sections 26 and 27, and serves as a spacer layer. The spacer layer 53 is a single layer of $SiO_2$ having an optical thickness of 0.1 QW of the wavelength 1542 nm. As noted above, if the optical component 51 is substituted for the optical component 21 in FIG. 1, the optical component 51 will almost completely counteract and compensate for the optical path length differential introduced between the beams 16 and 17 by the element 12.

Figure 4:
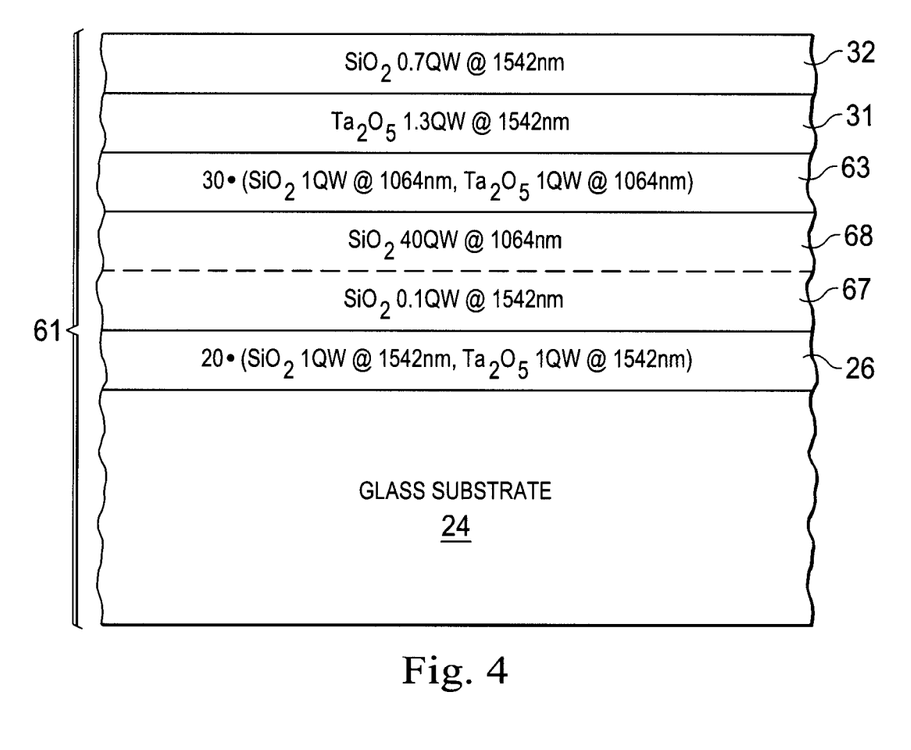
FIG. 4 is a diagrammatic fragmentary sectional side view of an optical component that is an alternative embodiment of the optical component of FIG. 3.

In another variation, the optical thickness of the spacer layer 53 can be increased, and the number of pairs of alternating layers in the reflective section 27 can be decreased. As an example of this approach, FIG. 4 is a diagrammatic fragmentary sectional side view of an optical component 61 that is an alternative embodiment of the optical component 51 of FIG. 3. Identical or equivalent portions are identified with the same reference numerals, and the following discussion focuses on the differences. For clarity, the optical component 61 is not shown to scale in FIG. 4. In the optical component 61, a reflective section 63 has replaced the reflective section 27 of the optical component 51 in FIG. 3. The reflective section 63 differs from the reflective section 27 in that it has fewer pairs of alternating layers. In particular, the reflective section 63 has 30 pairs of alternating layers, rather than 50 pairs of alternating layers. More specifically, the reflective section 63 includes 30 layers of $SiO_2$ that alternate with 30 layers of $Ta_2O_5$, each of these 60 layers having an optical thickness of 1 QW of the wavelength 1064 nm.

In the optical component 61 of FIG. 4, two spacer layers 67 and 68 have replaced the spacer layer 53 of the optical component 51 in FIG. 3. The spacer layer 67 is a single layer of SiO₂ having an optical thickness of 0.1 QW of the wavelength 1542 nm, and the spacer layer 68 is a single layer of SiO₂ having an optical thickness of 40 QW of the wavelength 1064 nm. Because the spacer layers 67 and 68 are each made of SiO₂ and physically engage each other, as a practical matter they collectively form only a single layer of SiO₂. They are shown as separate layers in FIG. 4 only to facilitate a clearer understanding of the optical component 61. A broken line is provided between layers 67 and 68 to diagrammatically indicate that they are actually just different portions of a single layer.

Figure 5:
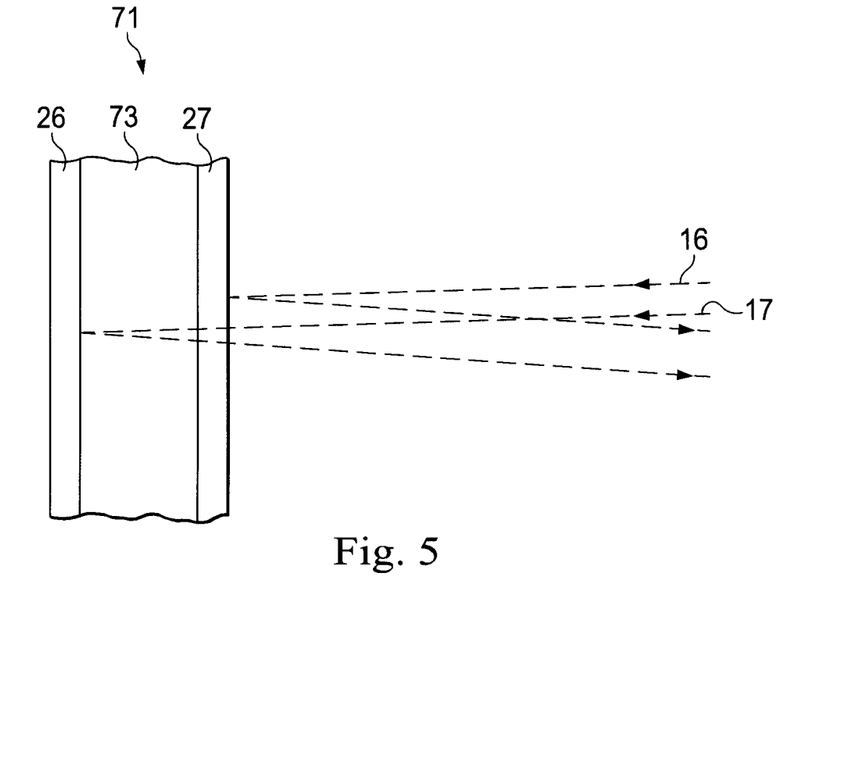
FIG. 5 is a diagrammatic fragmentary side view of an optical component that is a further alternative embodiment of the optical component of FIG. 3.

FIG. 5 is a diagrammatic fragmentary side view of an optical component 71 that is a further alternative embodiment of the optical component 51 of FIG. 3. Identical or equivalent parts are identified with the same reference numerals, and the following discussion focuses on the differences. For clarity, the optical component 71 is not shown to scale in FIG. 5. The optical component 71 of FIG. 5 is intended for use in an application where a relatively large optical path length differential exists between the two radiation beams 16 and 17. Because the optical path length differential is relatively large, and a relatively large optical path length correction is needed, a relatively large spacer layer 73 is provided between the reflective sections 26 and 27, the spacer layer 73 having an optical thickness that is appropriate to obtain the desired optical path length correction. Due to the fact that the spacer layer 73 is relatively thick, the spacer layer 73 also serves as a substrate, and so the glass substrate shown at 24 in FIG. 3 is omitted from the optical component 71 of FIG. 5.

Figure 6:
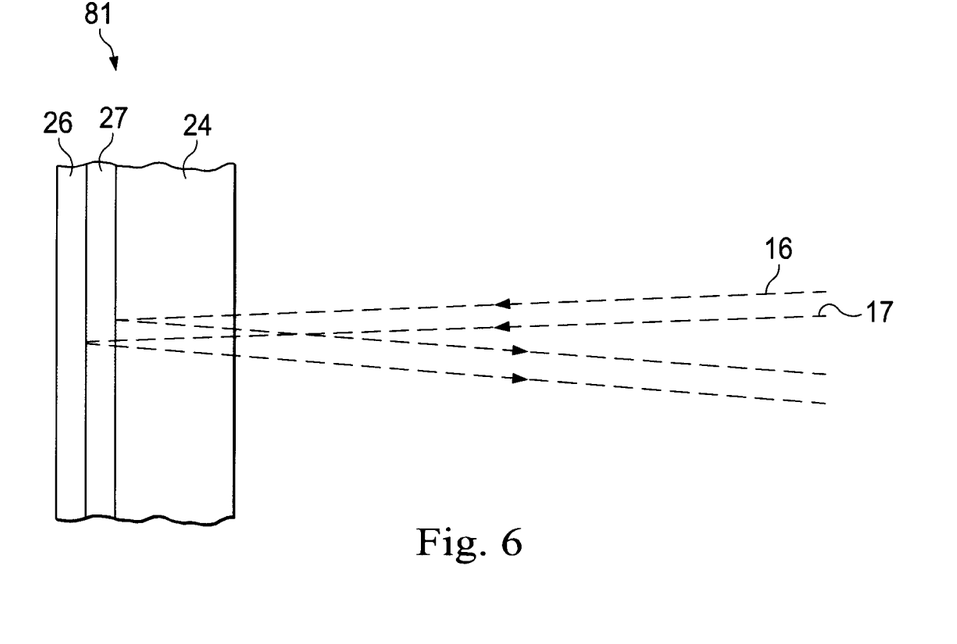
FIG. 6 is a diagrammatic fragmentary side view of an optical component that is a further alternative embodiment of the optical component of FIG. 1.

FIG. 6 is a diagrammatic fragmentary side view of an optical component 81 that is a further alternative embodiment of the optical component 21 of FIG. 1. Identical or equivalent portions are identified with the same reference numerals, and the following discussion focuses on the differences. For clarity, the optical component 81 is not shown to scale in FIG. 6. The optical component 81 includes the same glass substrate 24 and the same reflective sections 26 and 27 as the optical component 21, but they are arranged differently. In particular, the reflective sections 26 and 27 are provided on opposite sides of the substrate 24, with the reflective section 27 disposed between the reflective section 26 and the substrate 24. Between the reflective section 27 and the substrate 24 there are two layers that are functionally equivalent to the layers 31 and 32 in FIG. 3, but have optical thicknesses different from those of the layers 31 and 32, and are so thin that they are not visible in FIG. 6. The beam 16 travels through the substrate 24 to the reflective section 27, where it is reflected and then travels back through the substrate 24. The beam 17 travels through the substrate 24 and the reflective section 27 to the reflective section 26, where it is reflected and travels back through the reflective section 27 and the substrate 24. In the embodiment of FIG. 6, if the material of the substrate 24 happens to introduce any dispersive effect, the reflective sections 26 and 27 can be adjusted to compensate for that.

Figure 7:
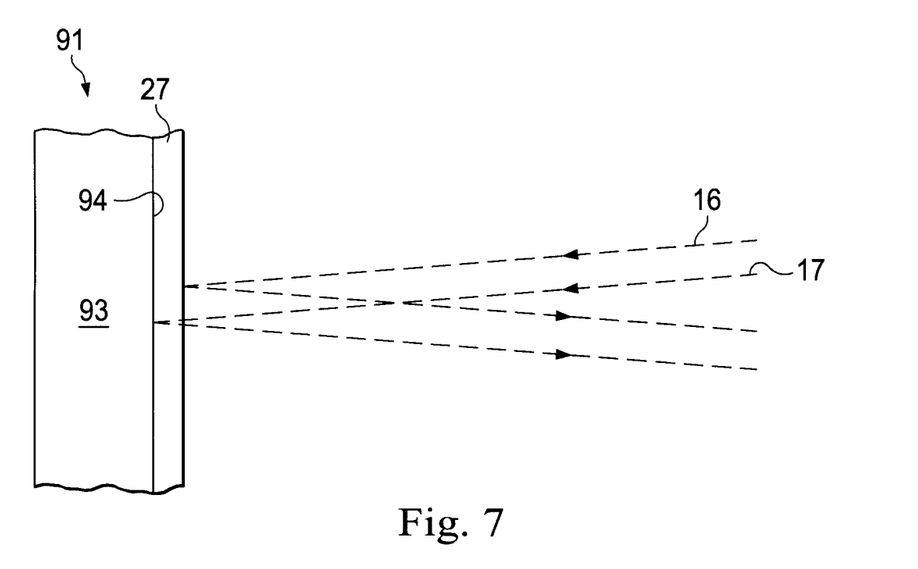
FIG. 7 is a diagrammatic fragmentary side view of an optical component that is yet another alternative embodiment of the optical component of FIG. 1.

FIG. 7 is a diagrammatic fragmentary side view of an optical component 91 that is yet another alternative embodiment of the optical component 21 of FIG. 1. Identical or equivalent portions are identified with the same reference numerals, and the following discussion focuses on the differences. For clarity, the optical component 91 is not shown to scale in FIG. 3. The optical component 91 includes the reflective section 27 of the optical component 21, but the reflective section 26 is omitted, and the glass substrate 24 is replaced with a substrate 93 that is made of aluminum and that has a polished external surface 94 which is reflective to the 1542 nm wavelength of the beam 17. The reflective section 27 is provided on the surface 94. The substrate 93 could alternatively be made from some other type of metal, or from some other suitable material that can have a surface which is highly reflective to the relevant wavelength(s). As another alternative, the substrate 93 could be made from glass or some other non-reflective material, and could have on the surface 94 a thin layer of a metal or some other material that is highly reflective to the relevant wavelength(s).

Figure 8:
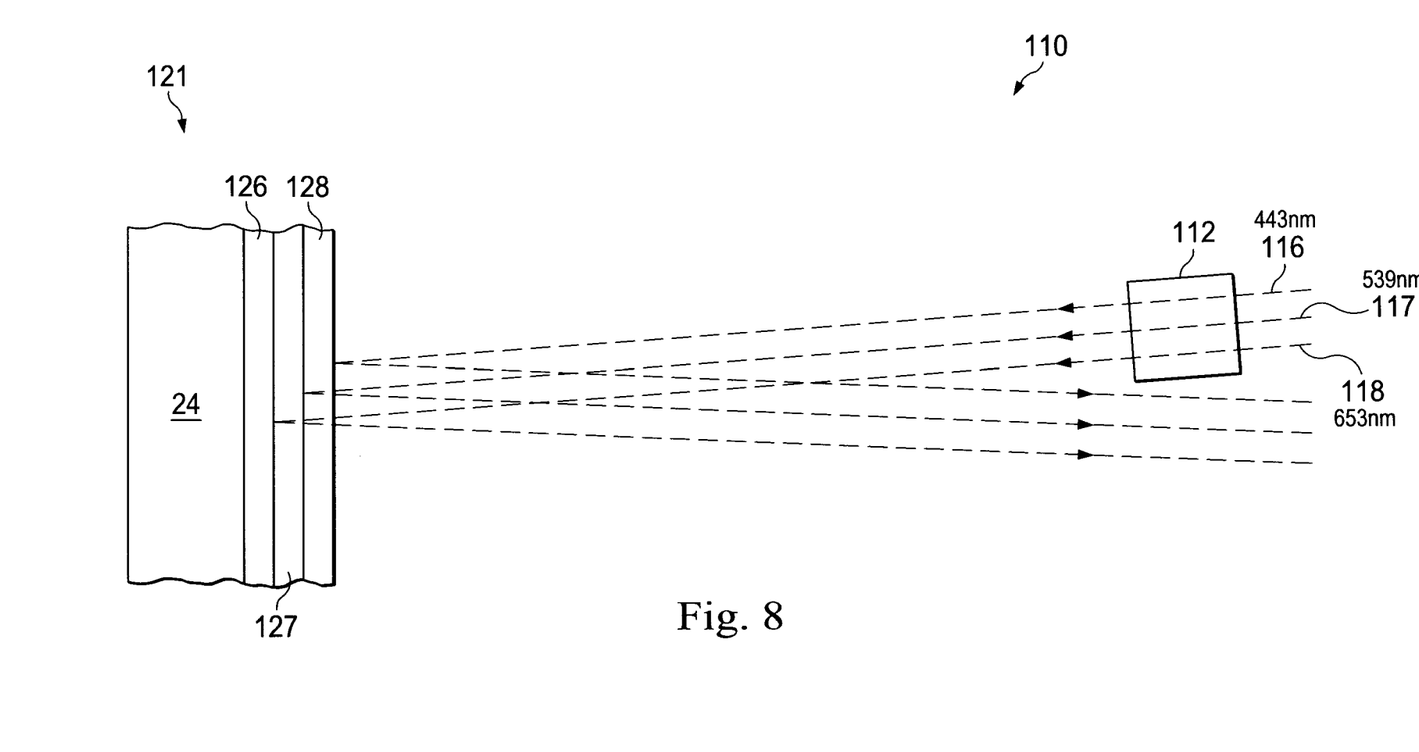
FIG. 8 is a diagrammatic view of an apparatus in the form of an optical system that is an alternative embodiment of the optical system of FIG. 1, and that includes an optical component.

For simplicity, the foregoing discussion of FIGS. 1-7 has been presented in the context of two specific wavelengths that are 1064 nm and 1542 nm. However, the beams 16 and 17 could alternatively involve mutually exclusive ranges of wavelengths that have 1064 nm and 1524 nm as respective center wavelengths. Moreover, the invention is not limited to two specific wavelengths, or even two ranges of wavelengths, but could instead involve three or more wavelengths, and/or three or more wavelength ranges. As one example, FIG. 8 is a diagrammatic view of an apparatus in the form of an optical system 110 that is an alternative embodiment of the optical system 10 of FIG. 1. Identical or equivalent portions are identified with the same reference numerals, and the following discussion focuses on the differences.

In the system 110 of FIG. 8, an optical element 112 has been substituted for the fused silica element 12 of the system 10 in FIG. 1. The optical element 112 is made of BK7 glass, and has a physical thickness of 1 cm. Three radiation beams 116, 117 and 118 of laser light propagate through the element 112. The beams 116-118 would normally be coincident, but for clarity they are shown in FIG. 8 as being slightly spaced. The beam 116 has a wavelength of 443 nm, the beam 117 has a wavelength of 539 nm, and the beam 118 has a wavelength of 653 nm. These three wavelengths correspond to the basic colors of red, green and blue. Alternatively, the beams 116-118 could each involve a range of wavelengths, where the respective indicated wavelength is the center wavelength of the range. The optical path length of the beam 116 within element 112 will be approximately 69.1 μm longer than the optical path length of beam 117 within the element, and the optical path length of beam 117 within the element will be approximately 46.5 μm longer than the optical path length of the beam 118 within the element.

An optical component 121 influences the relative optical path lengths of the beams 116, 117 and 118 in a manner that is equal and opposite to the optical path length differential introduced by the element 112. For clarity, the optical component 121 is not shown to scale in FIG. 8. The optical component 121 includes the glass substrate 24, and three reflective sections 126, 127 and 128 provided on a side of the substrate 24 optically nearest the element 112. The reflective section 128 reflects the beam 116, and passes the beams 117 and 118. The reflective section 128 has an optical thickness of 34.55 μm, which is half the optical path-length differential of 69.1 μm between the beams 116 and 117. The reflective section 127 reflects the beam 117, and passes the beam 118. The reflective section 127 has an optical thickness of 23.25 μm, which is half the 46.5 micron optical path length differential between the beams 117 and 118. The reflective section 126 reflects the beam 118.

Figure 9:
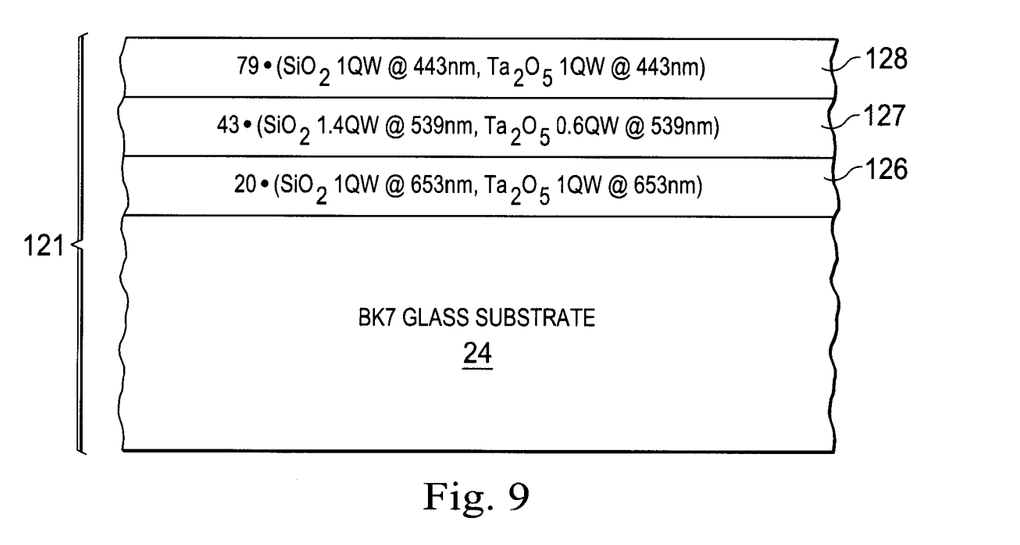
FIG. 9 is a diagrammatic fragmentary sectional side view showing the optical component of FIG. 8 in an enlarged scale, and providing additional detail about its structure.

FIG. 9 is a diagrammatic fragmentary sectional side view showing the optical component 121 of FIG. 8 in an enlarged scale, and providing additional detail about its structure. For clarity, the optical component 121 is not shown to scale in FIG. 9. In FIG. 9, the reflective section 126 has 20 layers of SiO₂ that alternate with 20 layers of Ta₂O₅, where each of these 40 layers has an optical thickness of 1 QW of the wavelength of 653 nm. The reflective section 127 has 43 layers of SiO₂ that each have an optical thickness of 1.4 QW of wavelength 539 nm, and that alternate with 43 layers of Ta₂O₅ that each have an optical thickness of 0.6 QW of wavelength 539 nm. The reflective section 128 has 79 layers of SiO₂ that each have an optical thickness of 1 QW of wavelength 443 nm, and that alternate with 79 layers of Ta₂O₅ that each have an optical thickness of 1 QW of wavelength 443 nm. The reflective section 126 reflects a waveband of approximately 610 nm to 700 nm. The reflective section 127 reflects a waveband of approximately 500 nm to 600 nm while passing the waveband of approximately 610 nm to 700 nm. The reflective section 128 reflects a waveband of approximately 400 nm to 490 nm, while passing a waveband of approximately 500 nm to 700 nm.

One practical application for the optical component 121 of FIGS. 8 and 9 is a not-illustrated color projector of the type that has multiple interchangeable lens assemblies. Each lens assembly has a respective different focal length, and has different optical characteristics. One such optical characteristic is dispersion, which affects the location at which each wavelength focuses along an optical axis. Each of the multiple different lens assemblies could include a respective optical component of the general type shown at 121 in FIGS. 8 and 9, where the multiple reflective sections of each such component would be configured to effect the appropriate optical path length adjustments needed for that particular lens assembly.

In each of the optical components 21, 51, 61, 71, 81, 91 and 121 respectively shown in FIGS. 2, 3, 4, 5, 6, 7 and 9, more than 99% of the energy of each wavelength will be reflected if the layers in the reflective sections are all of good quality. The theoretical performances are more than 99.9%.

In the disclosed embodiments, the minimum optical path length differential that can reasonably be corrected is limited by the need to have a high degree of reflection for one wavelength range in each reflective section that must also pass one or more other wavelength ranges. As a reflective section gets thinner, its reflectivity decreases. For visible light, a reasonable minimum optical thickness is approximately 4 μm, depending on what is considered to be an acceptable loss for the particular application.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising:
a first optical component configured to transmit at least first and second wavelengths that are different, said first and second wavelengths travelling along respective first and second optical paths, said first optical component having a first dispersion characteristic that introduces a first optical path-length difference between a first optical path length traveled by said first wavelength along said first optical path through said first optical component and a second optical path length traveled by said second wavelength along said second optical path through said first optical component, wherein said second optical path length is shorter than said first optical path length;
a path-length adjusting optical component that is reflective to each of said first and second wavelengths and configured to compensate for said first optical path-length difference introduced by said dispersion characteristic of said first optical component, wherein first and second optical paths each include a reflection by said path-length adjusting optical component, wherein a third optical path length traveled by said first wavelength along said first optical path from arrival at to departure from said optical component is shorter than a fourth optical path length traveled by said second wavelength along said second optical path from arrival at to departure from said first optical component, wherein a second optical path-length difference between said third optical path length and said fourth optical path length is approximately equal to said first optical path-length difference.

2. The apparatus according to claim 1, wherein said first optical component is further configured to transmit a third wavelength that is different from each of said first and second wavelengths, said third wavelength traveling along a third optical path that incorporates said first optical component and includes a reflection by said path-length adjusting optical component;
wherein said first dispersion characteristic of said first optical component causes a fifth optical path length traveled by said third wavelength through said first optical component along said third optical path to be shorter than said second optical path length; and
wherein a sixth optical path length traveled by said third wavelength along said third optical path from arrival at to departure from said path-length adjusting optical component is longer than said fourth optical path length.

3. The apparatus according to claim 1, wherein said path-length adjusting optical component includes:
a first reflective section that reflects said first wavelength and transmits said second wavelength; and
a second reflective section that reflects said second wavelength, said second optical path extending through said first reflective section toward said second reflective section, and then through said first reflective section away from said second reflective section.

4. The apparatus according to claim 3, wherein an optical distance to said second reflective section along said second optical path from a side of said first reflective section remote from said second reflective section is approximately half of a difference between said third and fourth optical path lengths.

5. The apparatus according to claim 4, wherein said path-length adjusting optical component includes a spacer disposed between said first and second reflective sections, said spacer being transmissive to said second wavelength.

6. The apparatus according to claim 4, wherein said path-length adjusting optical component includes a substrate, said first and second reflective sections being provided on one side of said substrate, with said second reflective section between said substrate and said first reflective section.

7. The apparatus according to claim 4, wherein said path-length adjusting optical component includes a substrate that is transmissive to each of said first and second wavelengths, said first and second reflective sections being provided on one side of said substrate, with said first reflective section between said substrate and said second reflective section.

8. The apparatus according to claim 4, wherein said path-length adjusting optical component includes a substrate, said second reflective section including a reflective surface provided on said substrate.

9. The apparatus according to claim 4, wherein said first reflective section includes a thin-film optical coating having a plurality of layers.

10. The apparatus according to claim 9, wherein said second reflective section includes a thin-film optical coating having a plurality of layers.

11. A method of optical path length adjustment, comprising:
routing first radiation and second radiation respectively having first and second wavelengths that are different through a first optical component along respective first and second optical paths, said first optical component having a first dispersion characteristic that introduces a first optical path-length difference between a first optical path length traveled by said first wavelength along said first optical path and a second optical path length traveled by said second wavelength along said second optical path, said second optical path length being shorter than said first optical path length;

reflecting said first radiation with a path-length adjusting optical component while said first radiation is traveling along said first optical path; and reflecting said second radiation with said path-length adjusting optical component while said second radiation is traveling along said second optical path, said path-length adjusting optical component causing a third optical path length traveled by said first radiation along said first optical path from arrival at to departure from said path-length adjusting optical component to be shorter than a fourth optical path length traveled by said second radiation along said second optical path from arrival at to departure from said path-length adjusting optical component, wherein a second optical path-length difference between said third optical path length and said fourth optical path length is approximately equal to said first optical-length difference.

12. The method according to claim 11, including:

routing third radiation with a third wavelength different from said first and second wavelengths along a third optical path;

transmitting said third radiation through said first optical component, said dispersion characteristic causing a fifth optical path length traveled by said third radiation to be shorter than said second optical path length; and reflecting said third radiation with said path-length adjusting optical component while said third radiation is traveling along said third optical path, said path-length adjusting optical component causing a sixth optical path length traveled by said third radiation along said third optical path from arrival at to departure from said path-length adjusting optical component to be longer than said fourth optical path length.

13. The method according to claim 11, wherein said reflecting of said first radiation is carried out using a first reflective section of said optical component that is reflective to said first wavelength and transmissive to said second wavelength;

wherein said reflecting of said second radiation is carried out using a second reflective section of said optical component that is reflective to said second wavelength; and wherein said routing of said second radiation includes causing said second radiation to travel along said second optical path through said first reflective section toward said second reflective section, and to thereafter travel away from said second reflective section along said second optical path through said first reflective section.

14. The method according to claim 13, including configuring said path-length adjusting optical component so that an optical distance to said second reflective section along said second optical path from a side of said first reflective section remote from said second reflective section is approximately half of a difference between said first third and fourth optical path lengths.

15. The method according to claim 14, wherein said configuring includes providing a spacer between said first and second reflective sections, said spacer being transmissive to said second wavelength.

16. The method according to claim 14, wherein said configuring includes:

providing a substrate; and locating said first and second reflective sections on one side of said substrate, with said second reflective section between said substrate and said first reflective section.

17. The method according to claim 14, wherein said configuring includes providing a substrate that is transmissive to each of said first and second wavelengths; and locating said first and second reflective sections on one side of said substrate, with said first reflective section between said substrate and said second reflective section.

18. The method according to claim 14, wherein said configuring includes providing a substrate having thereon a reflective surface that serves as said second reflective section.

19. The method according to claim 14, including configuring said first reflective section to have a thin-film optical coating with a plurality of layers.

20. The method according to claim 19, including configuring said second reflective section to have a thin-film optical coating with a plurality of layers.

* * * * *

UNITED STATES PATENT AND TRADEMARK OFFICE
CERTIFICATE OF CORRECTION

| | |
|---|---|
| PATENT NO. | : 8,456,740 B2 |
| APPLICATION NO. | : 12/760846 |
| DATED | : June 4, 2013 |
| INVENTOR(S) | : Daniel B. Mitchell et al. |

It is certified that error appears in the above-identified patent and that said Letters Patent is hereby corrected as shown below:

In the Claims:

In claim 14, column 10, line 19, "first" should be omitted.

Signed and Sealed this
Thirtieth Day of July, 2013

Teresa Stanek Rea
*Acting Director of the United States Patent and Trademark Office*